Figure 1:
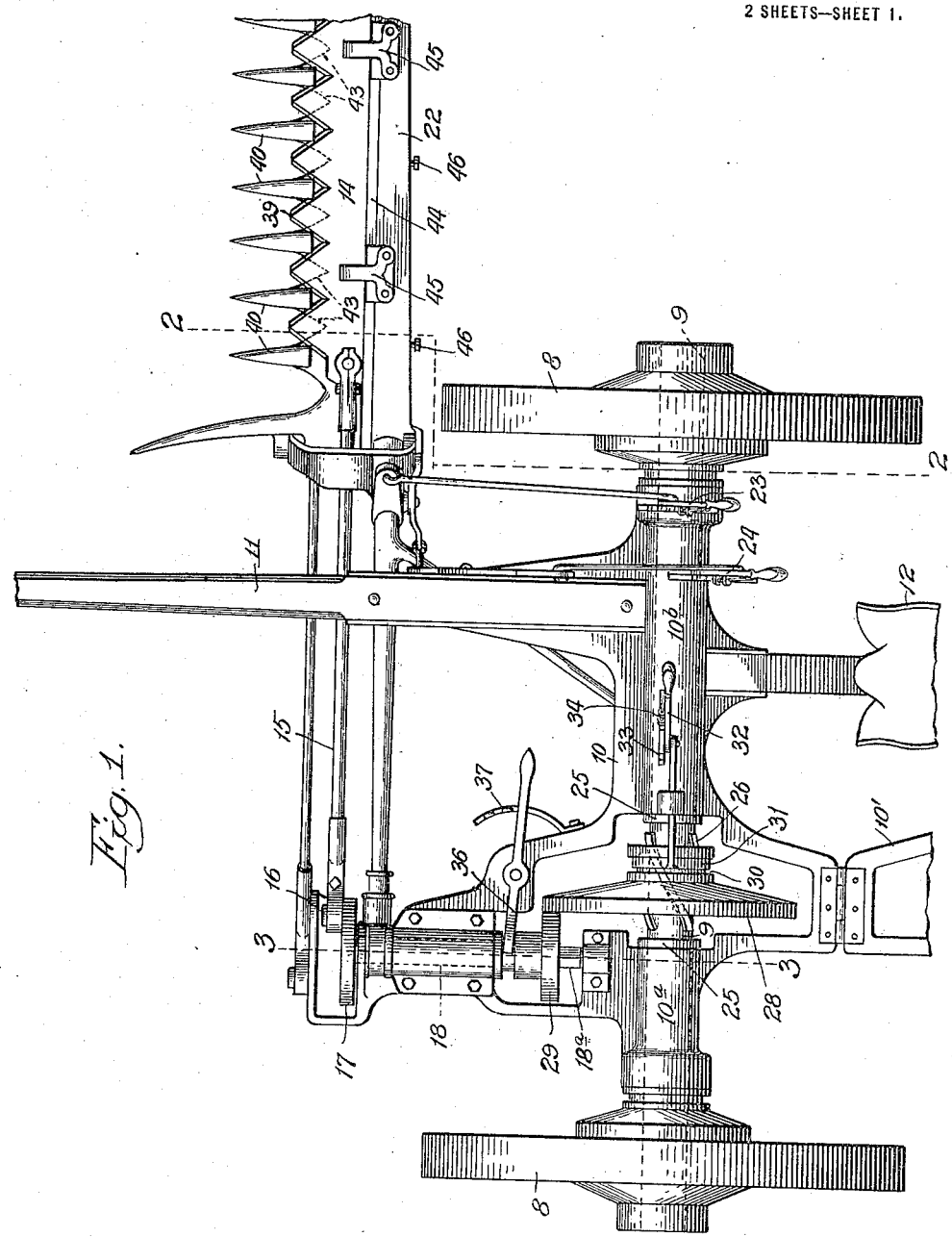

R. G. HARRIER.
MOWING MACHINE.
APPLICATION FILED JUNE 9, 1916.

1,219,552.

Patented Mar. 20, 1917.
2 SHEETS—SHEET 1.

Witness:
John Enders

Inventor:
Richard G. Harrier
by Fred Gerlach
his Atty.

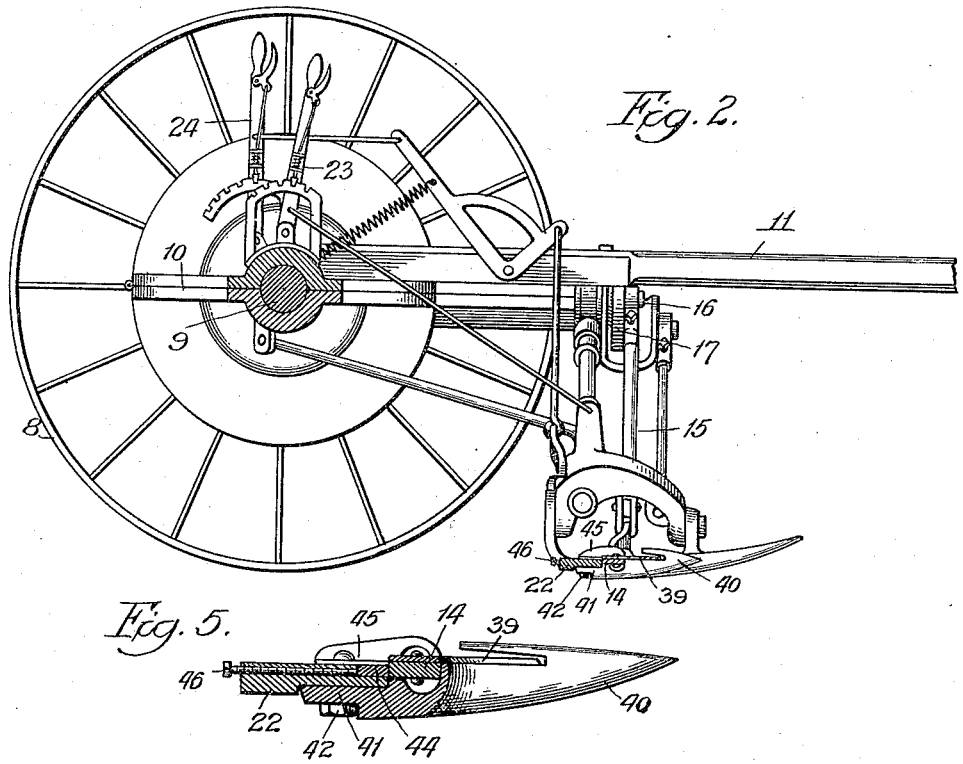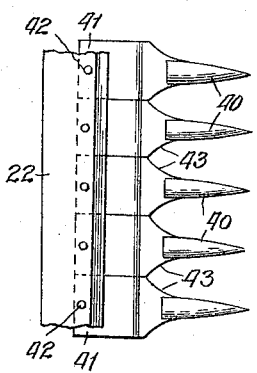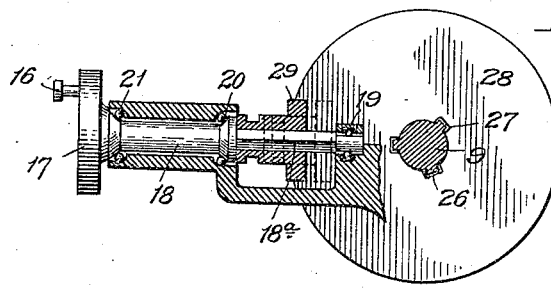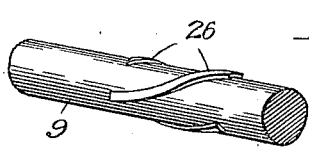

UNITED STATES PATENT OFFICE.

RICHARD G. HARRIER, OF NORTH BEND, NEBRASKA.

MOWING-MACHINE.

1,219,552. Specification of Letters Patent. Patented Mar. 20, 1917.

Application filed June 9, 1916. Serial No. 102,638.

*To all whom it may concern:*

Be it known that I, RICHARD G. HARRIER, a citizen of the United States, and a resident of North Bend, in the county of Dodge and State of Nebraska, have invented certain new and useful Improvements in Mowing-Machines, of which the following is a full, clear, and exact description.

The invention relates to mowing machines.

One object of the invention is to provide a mowing machine with improved mechanism for operating the cutter bar. A further object of the invention is to provide an improved form of guard-finger which will guide the stalks toward the meeting edges of the V-shaped cutter knives.

A still further object is to provide an adjustable guide for the reciprocable bar on which the knives are sustained.

The invention consists in the several novel features hereinafter set forth and more particularly defined by claims at the conclusion hereof.

In the drawings: Figure 1 is a plan of a mowing machine embodying the invention. Fig. 2 is a section taken on line 2—2 of Fig. 1. Fig. 3 is a section taken on line 3—3 of Fig. 1. Fig. 4 is a detail of the driving axle. Fig. 5 is a section through the cutting mechanism. Fig. 6 is a plan of the cutting mechanism.

The mowing machine comprises the usual ground wheels 8 carrying an axle 9, a suitable supporting frame 10 mounted on the axle, a draft-tongue 11 secured to the frame, an operator's seat 12, a cutter bar 14, a pitman 15 suitably pivoted at one end to cutter bar 14 and its other end to a wrist pin 16 on a crank 17, a crank-disk shaft 18 mounted in suitable bearings 19, 20 and 21 on the frame. A cover 10' is hinged to the supporting frame 10 so that it may be swung into position to cover the friction gearing and to permit access thereto when desired. A knife-supporting bar 22 is suspended and supported in a manner well understood in the art, so that it can be raised and lowered and tilted, a lever 23 being provided for tilting the supporting bar 22 and a lever 24 for raising and lowering it, as well understood in the art.

The axle 9 is operated by the ground wheels 8 usually through clutches or ratchets, as well understood in the art. This shaft extends through bearings 10$^a$, 10$^b$ in the supporting frame and is secured against longitudinal movement in said frame by any suitable means, such as collars 25. This shaft is formed with a series of helical ribs 26 which fit slidably in and extend through correspondingly shaped grooves 27 in a driving disk or wheel 28 on said shaft. One of the faces of this disk is adapted for frictional engagement with a friction wheel 29 on the crank-shaft 18. These helical rib and groove connections between the axle 9 and the friction disk 28 serve to automatically force the disk toward and into frictional contact with the wheel 29 when the machine is being driven in forward direction, the inclination of the ribs 26 relatively to the shaft being such as to exert sufficient force upon the friction disk 28 for the purpose of insuring frictional engagement of the disk and the wheel 29. The hub of disk 28 is provided with a groove 30 for a fork 31, which is adapted to be operated by a suitable lever 32 to hold the disk out of operative relation with the wheel 29, a suitable rack 33 and lock 34 being provided for lever 32, so that the lever may be locked in position to hold the disk 28 in inoperative position.

Friction wheel 29 is slidably mounted on a square portion 18$^a$ of the crank-shaft 18 so that it may be shifted toward or from the axis of the disk 28 to vary the speed at which the pitman will be driven. A forked lever 36 pivoted to the frame 10 is adapted to adjust the wheel 29 and a suitable rack 37 is adapted to lock the lever 36 to hold the wheel in assigned longitudinal position on the crank-shaft.

In operation, the helical rib and groove connection between the axle 9 and the pitman 28 will initially force the disk into frictional engagement with the wheel 29 and then to drive the disk from the axle. This feature causes effective driving relation between the disk and the friction wheel to be maintained. This mechanism exemplifies simple, efficient, variable speed friction drive for operating the pitman for a reciprocating cutter-bar, it being understood that the rotation of the shaft 18 will operate the pitman 15 to reciprocate the cutter bar 14.

The cutter bar 14 has secured to the top thereof in usual manner, the V-shaped knives 39. Guard fingers 40 having their front ends pointed and having recesses cut therein for the knives, have their rear portions extended under the supporting bar 22, as at 41, and are secured to said bar by bolts or rivets 42. Beneath the rear portions of the knives, the guard fingers have their sides flared rearwardly as at 43 to form V-shaped pockets. This formation of the fingers directs the stalks between the rearmost portions of the cutting edges of the knives or into the apices of the spaces between the knives and renders those portions of the knives effective by directing the stalks thereto.

In practice, the cutter bar 14 becomes worn and for the purpose of compensating for wear a bar 44 is secured in a channel adjacent the front upper edge of the supporting bar 22 and this bar is held in said channel by the lugs 45 which are usually secured to the supporting bar and serve to hold the cutter bar on the supporting-bar. Set-screws 46 in the supporting bar 22 serve to adjust the bar 44 to compensate for wear.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a mowing machine, the combination of a frame, a cutter bar, carrying wheels, and mechanism for operating said cutter-bar comprising a drive shaft, a driven shaft, a friction drive wheel on the drive shaft, a friction wheel on the driven shaft mounted for engagement by said drive wheel, and a helical rib and groove driving connection between one of the shafts and the wheel thereon to automatically force one wheel into operative contact with the other wheel.

2. In a mowing machine, the combination of a frame, a reciprocable cutter bar, carrying wheels, a pitman for reciprocating said bar, and mechanism for operating said pitman comprising a drive shaft, a driven shaft, a friction drive wheel on the drive shaft, a friction wheel on the driven shaft mounted for engagement by said drive wheel, and a helical rib and groove driving connection between the drive shaft and said drive wheel whereby the drive wheel will be automatically forced into operative contact with the wheel on the driven shaft.

3. In a mowing machine, the combination of a frame, a cutter bar, carrying wheels, mechanism for operating said cutter bar comprising a drive shaft, a driven shaft, a friction drive wheel on the drive shaft, a friction wheel on the driven shaft mounted for engagement by said drive wheel, and a helical rib and groove driving connection between one of the shafts and the wheel thereon whereby the wheels will be automatically forced into operative contact, and means for adjusting one of the wheels relatively to the other to vary the speed of the driven shaft.

4. In a mowing machine, the combination of ground wheels, an axle driven by the ground wheels, a reciprocable cutter bar, a pitman for operating said bar, and mechanism for operating said pitman, comprising a friction drive wheel on the axle, a helical rib and groove connection between the axle and said drive wheel, a friction pulley, and a shaft for the friction pulley operatively connected to the pitman, said rib and groove connection acting to automatically force said wheel and said pulley into operative contact.

5. In a mowing machine, the combination of ground wheels, an axle driven by the ground wheels, a reciprocable cutter bar, a pitman for operating said bar, mechanism for operating said pitman, comprising a friction drive wheel on the axle, a helical rib and groove connection between the axle and said drive wheel, a friction pulley and a shaft for the friction pulley operatively connected to the pitman, said rib and groove connection acting to automatically force said wheel and said pulley into operative contact, and mechanism for adjusting the pulley on its shaft and toward or from the axis of the drive-wheel.

RICHARD G. HARRIER.

Copies of this patent may be obtained for five cents each, by addressing the "Commissioner of Patents, Washington, D. C."